US011599264B2

(12) United States Patent
Samuel et al.

(10) Patent No.: US 11,599,264 B2
(45) Date of Patent: Mar. 7, 2023

(54) CONTEXT BASED GESTURE ACTIONS ON A TOUCHSCREEN

(71) Applicant: Google LLC, Mountain View, CA (US)

(72) Inventors: Fady Samuel, Kitchener (CA); Varun Jain, Kitchener (CA)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/561,015

(22) Filed: Dec. 23, 2021

(65) Prior Publication Data

US 2022/0113864 A1 Apr. 14, 2022

Related U.S. Application Data

(63) Continuation of application No. 16/656,297, filed on Oct. 17, 2019, now Pat. No. 11,243,683, which is a continuation of application No. 15/587,587, filed on May 5, 2017, now abandoned, which is a continuation of application No. 13/567,828, filed on Aug. 6, 2012, now Pat. No. 9,684,398.

(51) Int. Cl.
*G06F 3/048* (2013.01)
*G06F 3/04883* (2022.01)
*G06F 3/041* (2006.01)
*G06F 3/0482* (2013.01)

(52) U.S. Cl.
CPC .......... *G06F 3/04883* (2013.01); *G06F 3/041* (2013.01); *G06F 3/0482* (2013.01); *G06F 3/048* (2013.01)

(58) Field of Classification Search
None
See application file for complete search history.

(56) References Cited

U.S. PATENT DOCUMENTS

| 8,473,289 | B2 | 6/2013 | Jitkoff et al. |
| D696,266 | S | 12/2013 | d'Amore et al. |
| D711,395 | S | 8/2014 | Hanson et al. |
| 9,032,332 | B2 | 5/2015 | Chae et al. |

(Continued)

FOREIGN PATENT DOCUMENTS

| CN | 101778147 A | 7/2010 |
| CN | 102479028 A | 5/2012 |

(Continued)

OTHER PUBLICATIONS

"Advisory Action", U.S. Appl. No. 13/567,828, dated Dec. 16, 2015, 3 pages.

(Continued)

*Primary Examiner* — Carl Adams
(74) *Attorney, Agent, or Firm* — Shumaker & Sieffert, P.A.

(57) ABSTRACT

A computer-implemented method for executing a default action on a touchscreen device is provided. The method includes receiving a touch input from a user on a touchscreen device and determining a context associated with the touch input. The context is associated with one or more actions including a default action. The method also includes determining that the received touch input comprises a default gesture, and performing the default action associated with the determined context. The default gesture may be a two-finger double-tap gesture. Systems and machine-readable media are also provided.

20 Claims, 5 Drawing Sheets

(56) References Cited

U.S. PATENT DOCUMENTS

| | | | |
|---|---|---|---|
| D740,303 S | 10/2015 | Perez et al. | |
| D744,505 S | 12/2015 | Wilberding et al. | |
| D747,352 S | 1/2016 | Lee et al. | |
| D760,773 S | 7/2016 | Cho et al. | |
| D761,812 S | 7/2016 | Motamedi | |
| D783,676 S | 4/2017 | Kim et al. | |
| D788,785 S | 6/2017 | Flood et al. | |
| 9,684,398 B1 | 6/2017 | Fady | |
| D823,862 S | 7/2018 | Chung et al. | |
| 10,747,554 B2 | 8/2020 | Chung et al. | |
| 11,243,683 B2 | 2/2022 | Samuel et al. | |
| 2009/0199130 A1 | 8/2009 | Tsern et al. | |
| 2009/0328072 A1 | 12/2009 | Shin et al. | |
| 2011/0066976 A1* | 3/2011 | Hwang | G06F 3/04883 715/810 |
| 2011/0157056 A1 | 6/2011 | Karpfinger | |
| 2011/0169760 A1 | 7/2011 | Largillier | |
| 2011/0181538 A1 | 7/2011 | Aono | |
| 2011/0216075 A1 | 9/2011 | Shigeta et al. | |
| 2011/0296333 A1 | 12/2011 | Bateman et al. | |
| 2011/0320477 A1 | 12/2011 | Nestler et al. | |
| 2012/0154294 A1 | 6/2012 | Hinckley et al. | |
| 2012/0166180 A1 | 6/2012 | Au | |
| 2012/0297041 A1 | 11/2012 | Momchilov | |
| 2012/0313869 A1 | 12/2012 | Konami | |
| 2013/0050109 A1 | 2/2013 | Ban | |
| 2013/0050131 A1 | 2/2013 | Lee | |
| 2013/0076659 A1 | 3/2013 | Miyaji | |
| 2013/0173513 A1 | 7/2013 | Chu et al. | |
| 2013/0297317 A1 | 11/2013 | Lee et al. | |
| 2013/0332856 A1 | 12/2013 | Sanders et al. | |
| 2014/0062853 A1 | 3/2014 | Chaudhri et al. | |
| 2014/0101617 A1 | 4/2014 | Yang et al. | |
| 2014/0164957 A1 | 6/2014 | Shin et al. | |
| 2014/0258937 A1 | 9/2014 | Lee | |
| 2014/0298244 A1 | 10/2014 | Kim | |
| 2015/0269937 A1 | 9/2015 | Jitkoff et al. | |
| 2015/0379558 A1 | 12/2015 | Jancar et al. | |
| 2016/0259499 A1 | 9/2016 | Kocienda et al. | |
| 2017/0235479 A1 | 8/2017 | Samuel et al. | |
| 2017/0308586 A1 | 10/2017 | Mohsin et al. | |
| 2017/0344197 A1 | 11/2017 | Kolli et al. | |
| 2019/0146643 A1 | 5/2019 | Foss et al. | |
| 2019/0370824 A1 | 12/2019 | Rathod | |
| 2020/0050358 A1 | 2/2020 | Samuel et al. | |
| 2020/0057541 A1 | 2/2020 | Wantland et al. | |
| 2020/0342494 A1 | 10/2020 | Delayen et al. | |

FOREIGN PATENT DOCUMENTS

| | | |
|---|---|---|
| CN | 104346024 A | 2/2015 |
| CN | 104598109 A | 5/2015 |
| EP | 2720126 A1 | 4/2014 |
| KR | 20090093444 A | 9/2009 |
| KR | 20140119611 A | 10/2014 |
| WO | 2017165114 A1 | 9/2017 |

OTHER PUBLICATIONS

"Advisory Action", U.S. Appl. No. 13/567,828, dated Oct. 20, 2016, 3 pages.
"Final Office Action", U.S. Appl. No. 16/656,297, dated Jul. 29, 2021, 13 pages.
"Final Office Action", U.S. Appl. No. 13/567,828, dated Sep. 24, 2015, 13 pages.
"Final Office Action", U.S. Appl. No. 13/567,828, dated Jul. 28, 2016, 15 pages.
"Final Office Action", U.S. Appl. No. 15/587,587, dated Jun. 14, 2019, 10 pages.
"Final Office Action", U.S. Appl. No. 15/587,587, dated Sep. 6, 2018, 10 pages.
"Non-Final Office Action", U.S. Appl. No. 16/656,297, dated Feb. 8, 2021, 13 pages.
"Non-Final Office Action", U.S. Appl. No. 15/587,587, dated Dec. 14, 2018, 9 pages.
"Non-Final Office Action", U.S. Appl. No. 13/567,828, dated Jan. 14, 2016, 13 pages.
"Non-Final Office Action", U.S. Appl. No. 15/587,587, dated Mar. 9, 2018, 8 pages.
"Notice of Allowance", U.S. Appl. No. 16/656,297, dated Oct. 21, 2021, 9 pages.
"Notice of Allowance", U.S. Appl. No. 13/567,828, dated Jan. 13, 2017, 9 pages.
"Notice of Allowance", U.S. Appl. No. 13/567,828, dated Apr. 17, 2017, 9 pages.
Egyed, "Suppression of Unintentional Touch Inputs Caused by Moving Content on a Display", Technical Disclosure Commons, Feb. 19, 2021, 9 pages.
Vogel, "Reducing Unintentional Clicks", Retrieved at: http://mediavataarme.com/index.php/industry-news/digital/item/6185-reducing-unintentional-clicks, Aug. 8, 2017, 3 pages.
"3D Touch", Apple Inc. [online]. Retrieved from the Internet: <https://developer.apple.com/ios/3d-touch/> Mar. 21, 2016, 5 pgs.
"Context menu", Wikipedia [online]. Retrieved from the Internet: <https://en.wikipedia.org/wiki/Context_menu> May 22, 2015, 3 pgs.
"Launchify—Quick App Shortcuts", Emberify—Instant [online]. Retrieved from the Internet: <https://play.google.com/store/apps/details?id=com.emberify.launchify&hl=en> Jan. 28, 2016, 3 pgs.
"UIApplicationShortcutItem", Apple Inc. [online]. Retrieved from the Internet: <https://developer.apple.com/reference/uikit/uiapplicationshortcutitem> Sep. 16, 2015, 2 pgs.
Chavanu, "Go Beyond Keyboard Shortcuts by Using Contextual Menus on Your Mac", MakeUseOf [online]. Retrieved from the Internet: <http://www.makeuseof.com/tag/go-beyond-keyboard-shortcuts-by-using-contextual-menus-on-your-mac/> Nov. 10, 2013, 5 pgs.
Prosecution History from U.S. Appl. No. 13/567,828, dated Feb. 24, 2014 through May 22, 2017, 207 pp.
Prosecution History from U.S. Appl. No. 15/374,110, dated Oct. 1, 2018 through Jun. 1, 2020, 160 pp.
Prosecution History from U.S. Appl. No. 15/587,587, dated Mar. 9, 2018 through Sep. 6, 2019, 86 pp.
Prosecution History from U.S. Appl. No. 16/656,297, dated Feb. 8, 2021 through Oct. 21, 2021, 71 pp.
Prosecution History from U.S. Appl. No. 29/571,026, dated Aug. 18, 2016 through Apr. 24, 2018, 42 pp.
Jain et al., "Context based adaption of application icons in mobile computing devices," 2013 Third World Congress on Information and Communication Technologies (WICT 2013), IEEE, Dec. 15, 2013, pp. 31-36.
Versluis, "3D Touch in iOS 9, Part 3: Adding Dynamic Shortcut Items", iOS Dev Diary [online]. Retrieved from the Internet: <http://pinkstone.co.uk/3d-touch-in-ios-9-part-3-adding-dynamic-shortcut-items/> Sep. 27, 2015, 6 pgs.

* cited by examiner

CONTEXT BASED GESTURE ACTIONS ON A TOUCHSCREEN

CROSS-REFERENCE TO RELATED APPLICATIONS

This application is a continuation, and claims the benefit under 35 U.S.C. § 120, of U.S. patent application Ser. No. 16/656,297, filed Oct. 17, 2019, which in turn claims priority to U.S. patent application Ser. No. 15/587,587, filed May 5, 2017, which in turn claims priority to U.S. patent application Ser. No. 13/567,828, filed Aug. 6, 2012, which is now U.S. Pat. No. 9,684,398, granted Jun. 20, 2017, of which the entire contents and substance are hereby incorporated by reference as is fully set forth below.

TECHNICAL FIELD

The present disclosure generally relates to operating a touchscreen device, and more particularly to executing a predefined action on a touchscreen device using a predefined gesture.

BACKGROUND

Touchscreen devices interact with the users by receiving input through touch operations. Such touchscreen devices may include, for example, desktop computers, laptop computers, tablet computers, smartphones, and televisions.

SUMMARY

The disclosed subject technology relates to a computer-implemented method for executing a default action on a touchscreen device. The method includes receiving a touch input from a user on a touchscreen device and determining a context associated with the touch input. The context is associated with one or more actions including a default action. The method also includes determining that the received touch input comprises a default gesture, and performing the default action associated with the determined context.

The disclosed subject technology further relates to a system for executing a default action on a touchscreen device. The system includes a memory storing executable instructions. The system also includes a processor coupled to the memory configured to execute the stored executable instructions to receive a touch input from a user on a touchscreen device and determine a context associated with the touch input. The context is associated with one or more actions including a default action predetermined by the user. The processor is further configured to determine whether the received touch input comprises a default gesture, and if the received touch input comprises the default gesture, perform the default action associated with the determined context.

The disclosed subject technology also relates to a machine-readable storage medium comprising machine-readable instructions for causing a processor to execute a method for executing a default action on a touchscreen device. The method includes receiving a touch input from a user on a touchscreen device and determining a context associated with the touch input based on information available to a user within a predetermined distance from a location on the touchscreen device at which the touch input is received. The context is associated with one or more actions including a default action predetermined by the user. The method also includes determining whether the received touch input comprises a two-finger double-tap gesture, and if the received touch input comprises the two-finger double-tap gesture, executing a predetermined application associated with the determined context.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

Figure 1:
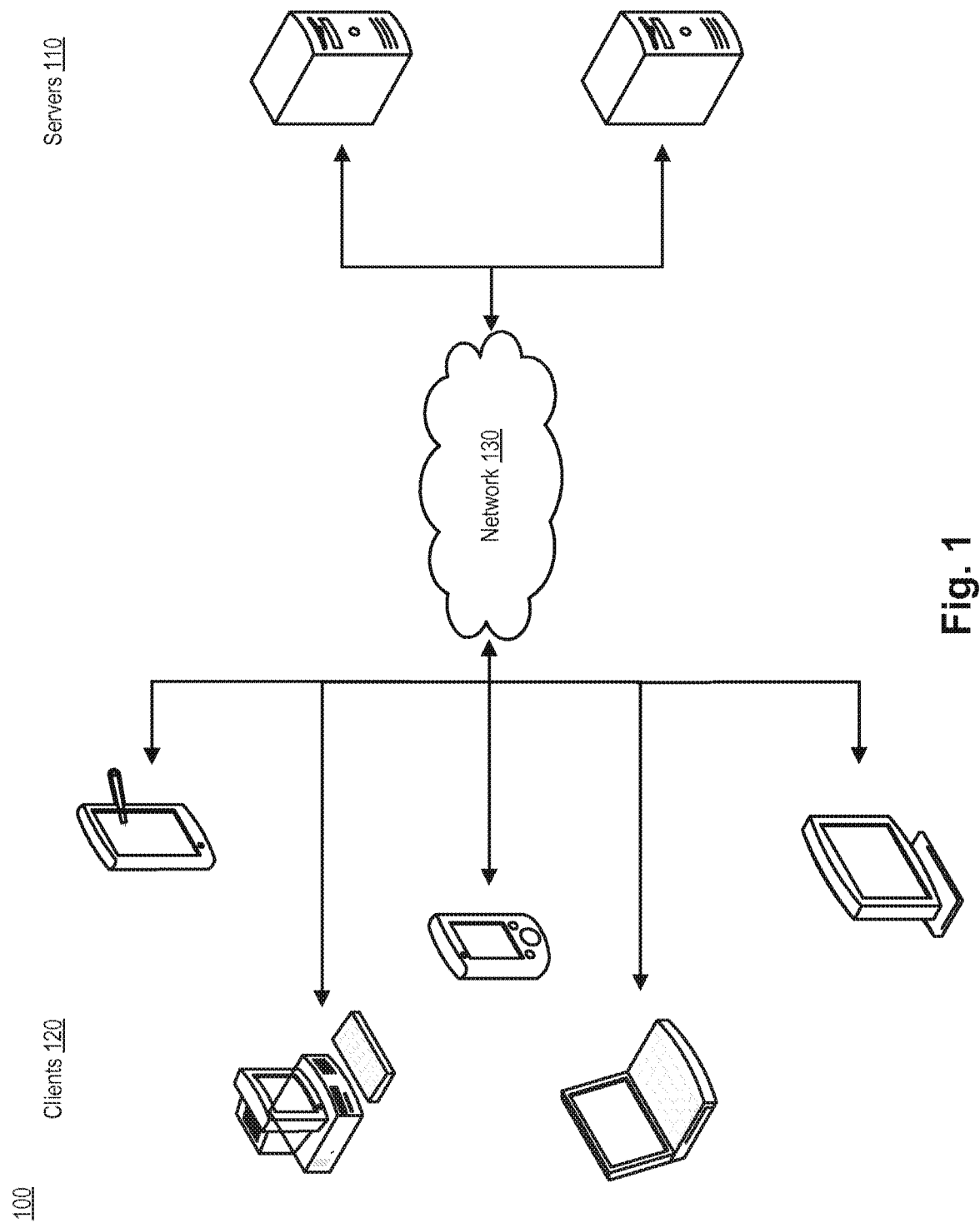
FIG. 1 illustrates an example architecture for executing a default action on a touchscreen device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Many applications may be installed on touchscreen devices such as, for example, smartphones, tablets computers, and laptop computers and desktop computers with touchscreens. Platforms which the touchscreen devices may allow for these applications to associate themselves with different contexts (which may also be referred to as "intents" herein). Platforms may be, for example, mobile operating systems. For example, a context or an intent can be determined based on a touch input made on a phone number displayed on a screen of a mobile device. Many applications installed or running on the touchscreen device may be associated with such context (determined based on touch input on a phone number). When such context is determined, the associated applications may perform actions that are associated with the context. Specifically, many voice-over-IP (VoIP) applications may register themselves with phone numbers, and when the user touches a phone number, the platform allows the user to select among the many VoIP applications which have registered themselves with phone numbers, for responding to the touch input. A touch on an email address may trigger determination of another context which many email client applications may associate themselves with. Another example in which a context may be determined is a touch on URL links which many web browser applications may associate themselves with.

Contexts may also be associated with different system actions. For example, a context may be determined based on the highlighting input on a text displayed on the screen of the touchscreen device. Such context may be associated with system actions such as copy, cut and paste. A touch input on the screen in general may give rise to determination of another context which may be associated with system actions such as paste or zoom in/out of displayed contents.

In existing platforms, a default application may be specified for a given context (e.g., determined based on touch input on a phone number, email address or URL Link). For example, a user may specify that whenever a phone number is touched upon, a specific VoIP application respond each time. However, specifying the default application may bury easy access to other options which may be associated with the given context. For example, if a default application is associated with telephone numbers, touching a telephone number would no longer bring up a menu for selecting an application for responding to the touch. Rather, the default application automatically responds to the touch. Therefore, if the user wishes for a different application to respond to the context later on, the user would have to go through the process of clearing the default, which may often require accessing multiple levels of settings menu.

Furthermore, for contexts that are associated with different system actions (e.g., touching a text leading to a menu for Cut, Copy, Paste, Delete and Select All), in existing platforms, the most commonly used of these available actions (e.g., Copy) or the most reasonable in a given context (e.g., Paste, if a blank space is touched) is given no shortcut.

According to various aspects of the subject technology, a method and system for executing a default action on a touchscreen device is provided. Two-finger double-tap gesture is a type of touch input which is relatively easy to perform, and there are currently no generally accepted actions associated with this gesture. In addition to the regular touch action (e.g., single-finger single tap) which may bring up the conventional list of options for responding to a touch gesture, a default action may be associated with a two-finger double tap. This way, the user may conveniently execute the default action by performing the two-finger double-tap gesture, without hiding easy access to other available actions. For example, telephone numbers may be associated with multiple VoIP applications, and a default action may be associated with an application "A". When the user wishes to use the application A when touching a telephone number, the user may perform the two-finger double-tap gesture. If the user wishes to select other applications for responding to a touch on a telephone number, the user may perform the traditional single-finger single-tap gesture, which may bring up the menu for selecting other applications to respond to the touch gesture.

Likewise, where a user operation reveals a series of system actions (e.g., touching near a text brings up a menu for Cut, Copy, Paste, Delete and Select All), the two-finger double tap may perform the option that is most commonly used, or the most reasonable given the context, while the single-finger single-tap gesture may bring up the list of options, as usual.

By way of non-limiting example, following are some default actions which may be performed by a two-finger double-tap gesture for various contexts:

1. Two-finger double tap selected text to copy.
2. Two-finger double tap an empty input box to paste.
3. Two-finger double tap to follow a link using a default browser.
4. Two-finger double tap to activate a "web intents" action. For example, two-finger double tap an image to add it to a default photo sharing site.
5. Two-finger double tap an email address to open up a default email client application.
6. Two-finger double tap an address to open up a default maps tool with that address.
7. Two-finger double tap a name to take to a profile page on a default social network.
8. Two-finger double tap a form element to auto-fill previously stored information.
9. Two-finger double tap a combo box (drop-down menu) to switch back to the default element.

While the subject technology is described above with a two-finger double-tap gesture, other gestures may also be used.

The term "application" as used herein encompasses its plain and ordinary meaning including, but not limited to, a piece of software. An application may be stored and run on a touchscreen device, the Internet, or other electronic devices. An application may also be stored on the internet and be run on a touchscreen device. An application may also be specifically designed to run on a specific type of electronic device. For example, an application may be designed specifically to run on a mobile touchscreen device such as a smartphone.

FIG. 1 illustrates an example architecture 100 for executing a default action on a touchscreen device. The architecture 100 includes servers 110 and clients 120 connected over a network 130. Each of the clients 120 may interact with users, and communicate with the servers 110 to execute a default action on a touchscreen device. The servers 110 may be any device having a processor, memory, and communications capability for communicating with the clients 120 for distributing applications associated with executing a default action on a touchscreen device. For example, the servers 110 may distribute applications to the clients 120, and the clients 120 may execute a default action using the distributed applications in response to a user input. The servers 110 may also receive instructions for executing a default action from the clients 120, which in turn may receive user input for executing the default action. The clients 120 may be the touchscreen device such as, for example, a desktop computer, a laptop computer, a mobile device (e.g., a smartphone, tablet computer, or PDA), a set top box (e.g., for a television), television, video game console, home appliance (e.g., a refrigerator, microwave oven, washer or dryer) or any other device having a touch interface, processor, memory, and communications capabilities for interacting with the user, receiving applications for executing a default action and/or communicating with the servers 110 to execute the default action.

The clients 120 may communicate with the servers 110 as described above, but the clients need not communicate with the servers to execute the default action on a touchscreen device. For example, the applications associated with executing a default action on a touchscreen device may be installed at the clients 120 locally (e.g., via a USB device or a local network such as, for example, LAN, Bluetooth, or near field communication). Further, the clients 120 may receive the user input for executing the default action and execute the default action at the clients.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
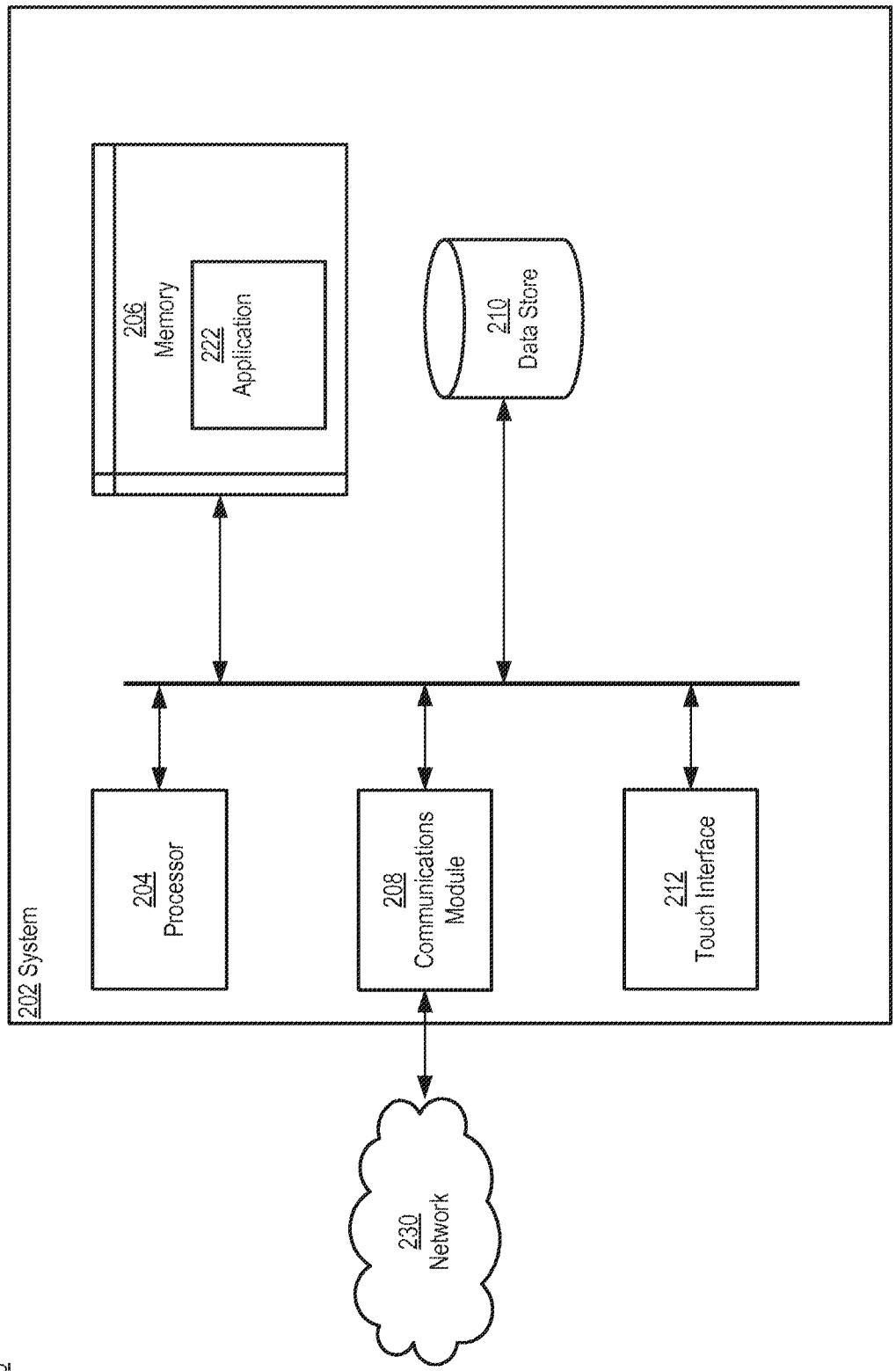
FIG. 2 is a block diagram illustrating an example system for executing a default action on a touchscreen device.

FIG. 2 is a block diagram 200 illustrating an example system 202 for executing a default action on a touchscreen device. The system 202 may be implemented, for example, at a touchscreen device (e.g., a client 120). The system 202 includes a processor 204, and a memory 206. The system 202 may also include a communications module 208, and may be connected to the network 230 via the communications module 208. The network 230 may be, for example, the network 130. The communications module 208 is configured to interface with the network 230 to send and receive information, such as data, requests, responses, and commands to other devices (e.g., servers 110) or systems on the network 230. The data sent and received through the communications module 208 may also include applications which may be used for executing default actions. The communications module 208 may be, for example, modems, Ethernet cards or mobile broadband adaptors.

The system 202 also includes a touch interface 212 through which a user may interact with the system 202 using touch input. Touch input may include various gestures, for example, single or multiple taps using one finger, single or multiple taps using multiple fingers, a swipe gesture using one or more fingers and a pinching or expanding gesture using multiple fingers. The touch interface 212 may be any types of interface for receiving and recognizing touch input such as, for example, capacitive-type touchscreens, resistive-type touchscreens, or optical touch recognition systems. The system 202 may receive a touch input through the touch interface 212 and determine the type of touch input received. For example, the system 202 may determine whether the received touch input is a single-finger single-tap gesture, or a two-finger double-tap gesture. Depending on the type of determined touch input and the context in which the touch input is received, the system 202 may perform an appropriate action. Such action may include executing an application 222 or performing a system action associated with the type of input and the context. The application 222 may be received from an external server (e.g., servers 110) through the network 230 or locally installed on the system 202 using a local connection (e.g., USB connection, Bluetooth or WiFi), and stored in the memory 206.

System 202 may also include a data store 210, which may also store the application 222. The data store 210 may be integrated with the memory 206, or may be independent from the memory and be in communication with the processor 204 and the memory. The data store 210 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to receive a touch input from a user through the touch interface 212 and determine a context associated with the touch input, where the context is associated with one or more actions including a default action. The context may be determined based on information displayed on the touch interface 212, information stored in the memory 206 or data store 210, and location and type of gesture of the touch input. The default action may be executing a predetermined application or executing a system action, depending on the determined context and the received touch input. The processor is also configured to determine whether the received touch input comprises a default gesture associated with a default action, and if so, perform the default action associated with the determined context. The processor is further configured to determine whether the received touch input is an action-select gesture not associated with a default action, and if so, provide to prompt the user to select an action from among the one or more actions associated with the determined context.

Figure 3:
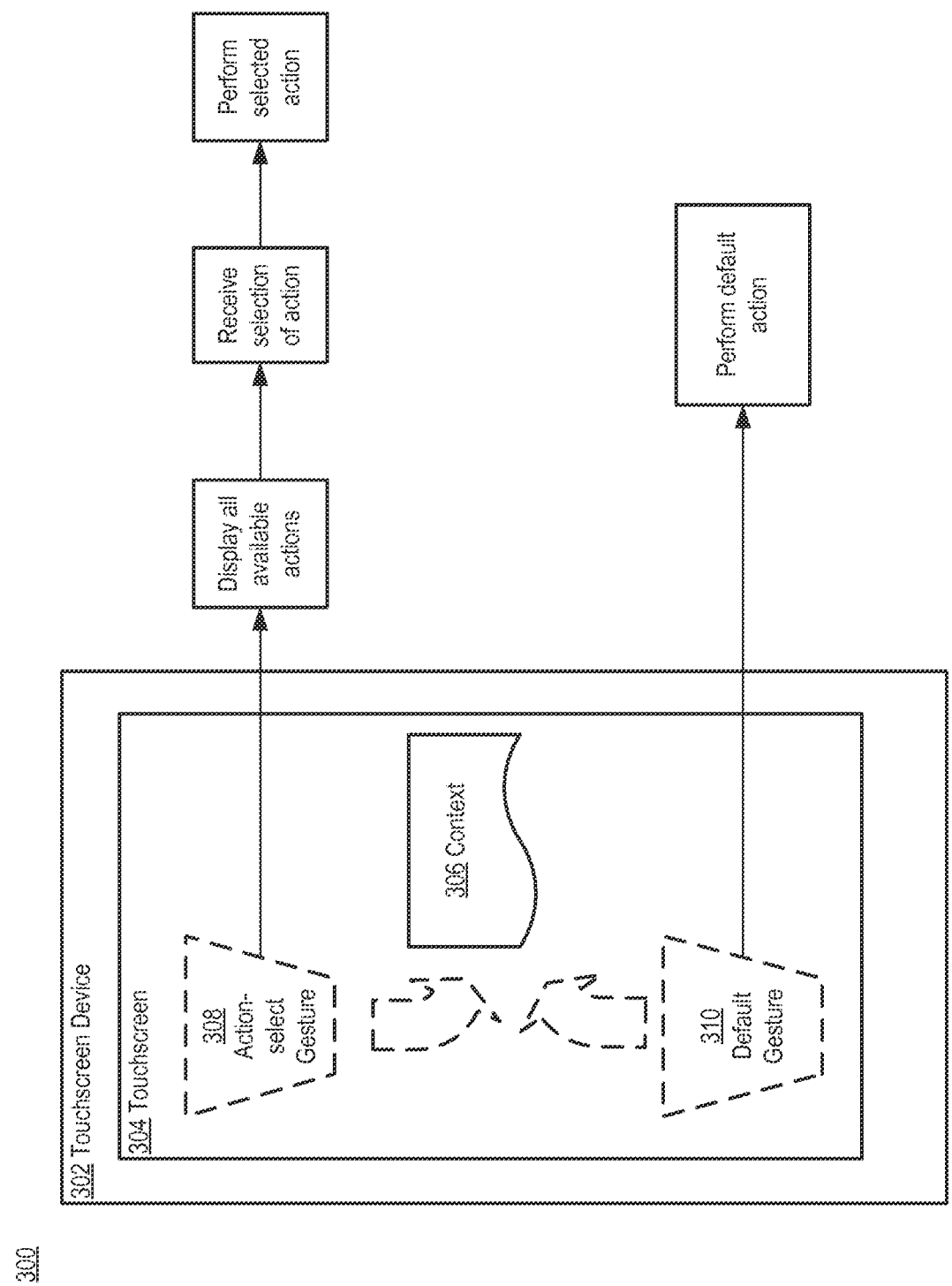
FIG. 3 is a diagram illustrating example operations for executing a default action on a touchscreen device.

FIG. 3 is a diagram 300 illustrating example operations for executing a default action on a touchscreen device. The operations may be performed, for example, by a touchscreen device 302 incorporating a system for executing a default action on a touchscreen device (e.g., system 202). The touchscreen device 302 includes a touchscreen 304 (e.g., touch interface 212). The touchscreen 304 displays information which a user may perceive, and also receives touch input from a user. Touch input may take various forms including different types of gestures. These gestures may be, for example, a single tap with a single finger, a double tap with one finger, a single tap with more than one finger, a double tap with more than one finger, a pinching gesture with more than one finger, an expanding gesture with more than one finger or a swipe gesture with one or more finger. The touchscreen device 302 interprets the touch input differently depending on the type of gestures used for the touch input.

The touch input may also be interpreted differently depending on the context in which the touch input is received. The context may be determined based on the location on the touchscreen 304 at which the touch input is received. For example, the touch input may be interpreted differently depending on the physical location of the touch input made on the touchscreen 304, or depending on the relative location of the touch input with respect to the information displayed on the touchscreen, even though same type of gesture is used. Specifically, a single tap with a single finger touch input on an "OK" button may indicate approval of information displayed on the touchscreen 304, whereas the same gesture made on a "cancel" button may indicate disapproval of the information displayed on the touchscreen. The context may also be determined based on the type of information displayed on the touchscreen 304 at the time touch input is received. For example, a touch input at a location where phone numbers are displayed may be interpreted differently as compared to a touch input received where an email address is displayed. Specifically, a single tap with a single finger at a telephone number may initiate a phone call; the same type of touch input at an email address may bring up a screen for composing an email.

The context may also include information stored in a memory (e.g., memory 206 or data store 210) of the touchscreen device 302 at the time touch input is received. For example, if a touch input is received at a location where the user may enter text while a selection of copied text is stored in the memory, the touchscreen device 302 may provide for an option to paste the copied text at the location the touch input is received.

When a touch input is received, a context 306 is determined. For example, the context 306 may be determined based on a touch input received on a telephone number displayed on the touchscreen 304. Determination is also made as to the type of touch input received. For example, the touch input may be an action-select gesture 308 or a default gesture 310.

The user may utilize the action-select gesture 308 to generally interact with the touchscreen device 302, and the action-select gesture may often be the primary means for interacting with the touchscreen device. For example, most of the user interface elements of the touchscreen device 302 may be pre-programmed to respond to an action-select gesture 308. As specific examples, an action-select gesture 308 on an icon representing an application executes the application; and an action-select gesture 308 on a touchscreen 304 places a cursor at the location the general gesture is received. Depending on the context 306, the action-select gesture 308 may also provide for prompting the user to select a desired action from a list of available actions that may be associated with the context. The action-select gesture 308 may be, for example, a single-finger single tap. The default gesture 310 may be a gesture that the user may use to perform a specific action. If a context 306 is associated with more than one possible action, then the default gesture 310 may be predetermined to be associated with a specific action, and the user may use the default gesture to perform that predetermined action. The default gesture 310 may be, for example, a two-finger double tap. Other types of gestures may also be used for the action-select gesture 308 and the default gesture 310.

In the example where the context 306 is determined based on a touch input received on a telephone number, if the touch input is determined to be a default gesture 310, then the default action associated with the context is performed. For example, many applications (e.g., application 222) may be installed on the touchscreen device 302 which are associated with phone numbers. These applications may be VoIP applications for making telephone calls, or contact management applications for managing contacts information including phone numbers. Out of the many applications installed on the touchscreen device 302 that are associated with phone numbers, a default application may be predetermined. When the default gesture 310 is received and the context 306 is determined based on a touch input received on a telephone number, then the predetermined default application is executed to perform the actions that the application was designed to perform, given the context 306.

For the same context 306 as in the above example where the touch input is received on a telephone number, if the received touch input is determined to be an action-select gesture 308, then all available actions for the context 306 may be made available to the user. For example, a list of all applications that are associated with the displayed telephone number is displayed to the user, and the user is prompted to select an application for handling the telephone number. After a selection is received from the user, the selected application is executed to perform the actions that the application was designed to perform, given the context 306.

While the above paragraphs discuss an example of the context 306 involving a telephone number, other types of contexts may also be determined which may be associated with various other types of actions. For example, the context 306 may be determined based on an email address displayed to the user, or a URL link which are associated with applications which are capable of handling email addresses and URL links, respectively. In the case where the context 306 is determined based on an input received on an email address, the receiving of a default gesture 310 executes a predetermined application capable of handling emails (e.g., an email client application). In the case where the context 306 is determined based on an input received on a URL link, the receiving of a default gesture 310 executes a predetermined application capable of handling URL links (e.g., a web browser application).

The context 306 may also be associated with system actions. System actions include, for example, actions related to the editing text or graphical objects, such as cut, copy, paste, delete and select. The context 306 may also be associated with other actions specific to the context. For example, where the context 306 is determined based on an input received on a combo box or a drop-down menu, the context may be associated with displaying the list of the selectable items. Where the context 306 is determined based on an input received on a photo, the context may be associated with executing an application capable of handling photos, as well as the system actions discussed above.

As discussed in the above examples, for the same context 306, receiving an action-select gesture 308 may provide for allowing the user an option of selecting a desired action or an application to be executed which are associated with the context 306, whereas receiving a default gesture 310 performs a predetermined action or executes a predetermined application associated with the context.

An action or an application to be executed upon receiving a default gesture 310 on a given context 306 may be determined based on the most logical or the most likely action/application that the user may wish to perform/execute, given the context. Examples may include receiving a default gesture 310 on a selected (highlighted) text which provides for copying the selected text into the memory; default gesture 310 on an empty input box while having a copied text stored in the memory which provides for pasting the copied text into the input box; default gesture 310 on a URL link which provides for executing a predetermined web browser application which opens up the link; a default gesture 310 on an image which shares the image on a predetermined photo sharing service; a default gesture 310 on an email address which executes a predetermined email client application which opens up a email compose interface; a default gesture 310 on an address which executes a map tool application which shows the area around the address; a default gesture 310 on a name of a person or business which opens a web browser or a social networking application showing the name's profile page; a default gesture 310 on an empty form field which automatically fills in the field with previously entered information; and a default gesture 310 on a combo box or a drop-down menu which selects a default menu element among the different menus of the combo box or the drop-down menu.

Figure 4:
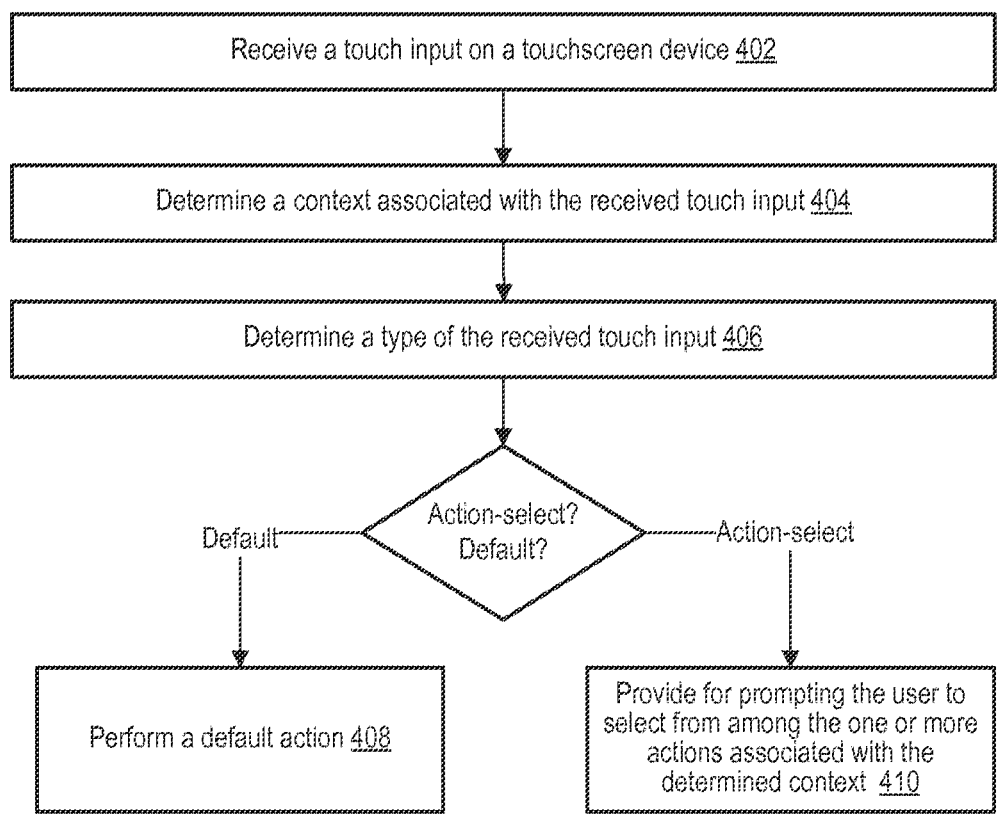
FIG. 4 illustrates an example flow diagram of example processes for executing a default action on a touchscreen device.

FIG. 4 illustrates an example flow diagram 400 of example processes for displaying virtual designs. The operations of FIG. 4 may be performed, for example, by the system 202. However, the operations of FIG. 4 are not limited to such a system, and may be performed using other systems/configurations.

The operation begins in step 402 where a touch input is received on a touchscreen device (e.g., touchscreen device 302). In step 404, a context (e.g., context 306) associated with the touch input is determined. The context is also associated with one more actions, including a default action.

In step 406, determination is made as to the type of the touch input received in step 402. If the touch input is a default gesture (e.g., default gesture 310), then in step 408, the default action associated with the context determined in step 404 is performed.

If in step 406, the touch input is determined to be an action-select gesture (e.g., action-select gesture 308), then in step 410, provision is made for prompting the user to select an action from among the one or more actions associated with the context determined in step 404.

In another example process, the process would be similar to that described above with reference to FIG. 4, except that after receiving the touch input (e.g., step 402), the determination is made as to the type of the touch input received. If the touch input is a default gesture (e.g., default gesture 310), then a context associated with the default gesture is determined. Next, the default action associated with the determined context is performed.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include, but not limited to, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
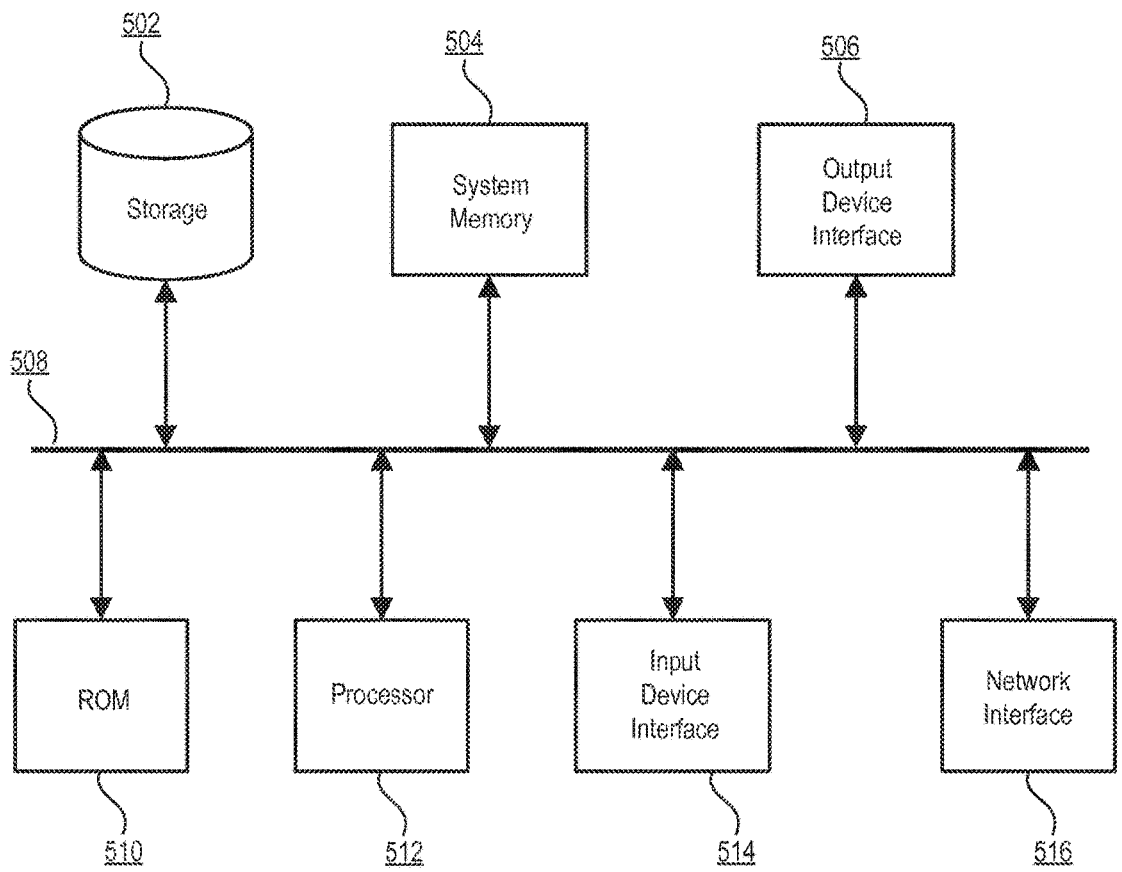
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that not all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method comprising:
    outputting, for display at a touch screen operatively coupled to a computing device, a graphical user interface including a plurality of icons representing applications;
    receiving an indication of a first gesture detected by the touch screen at a location at which a particular icon from the plurality of icons is displayed;
    determining a type of gesture associated with the first gesture, the type of gesture including a default gesture associated with a default action to open or execute an application represented by the particular icon or an action-select gesture associated with a menu of multiple selectable actions to perform with the application represented by the particular icon, the multiple selectable actions including at least one selectable action different than opening or executing the application represented by the particular icon;
    responsive to determining that the type of gesture associated with the first gesture is the default gesture, opening or executing the application represented by the particular icon;
    receiving an indication of a second gesture detected by the touch screen at the location at which the particular icon is displayed;
    determining the type of gesture associated with the second gesture;
    responsive to determining that the type of gesture associated with the second gesture is the action-select gesture associated with the menu of multiple selectable actions to perform with the application represented by the particular icon:
        identifying, based on the application represented by the particular icon, the multiple selectable actions to perform; and
        outputting, for display, a menu indicating the multiple selectable actions to perform;
    receiving an indication of a third gesture detected by the touch screen at an area of the menu where a particular selectable action from the multiple selectable actions is displayed; and
    responsive to receiving the third gesture, executing the application represented by the particular icon to perform the particular selectable action.

2. The method of claim 1, wherein the particular icon corresponds to a photo application and a selectable action among the menu of multiple selectable actions associated with the action-select gesture comprises sharing a photo on a predetermined photo sharing service.

3. The method of claim 1, wherein the particular icon corresponds to an email application and a selectable action among the menu of multiple selectable actions associated with the action-select gesture comprises opening a screen within the graphical user interface for composing an email within the email application.

4. The method of claim 1, wherein the default gesture is a single-tap gesture, and the action-select gesture is different than the single-tap gesture.

5. The method of claim 1, wherein the menu of the multiple selectable actions comprises a list of system actions including at least two of cut, copy, paste, delete, or select.

6. The method of claim 1, the method further comprising: determining a current context of the computing device, wherein the identifying of the multiple selectable actions to perform is based on the current context of the computing device.

7. The method of claim 6, wherein determining the current context of the computing device comprises:
    prior to receiving the indication of the first gesture or the second gesture:
        associating a first set of the multiple selectable actions with a first context; and
        associating a second set of the multiple selectable actions with a second context;
    responsive to receiving the first gesture, determining the current context of the computing device is the first context and outputting a menu indicating the first set of the multiple selectable actions; and
    responsive to receiving the second gesture, determining the current context of the computing device is the second context and outputting a menu indicating the second set of the multiple selectable actions.

8. The method of claim 6, wherein at least one of the menu of selectable actions to perform with the application represented by the particular icon that is based on the current context is an action previously determined for the current context by a user of the computing device.

9. A mobile computing device comprising:
    a touch screen that displays a graphical user interface that includes a plurality of icons representing applications of a mobile operating system of the mobile computing device;
    a memory that stores instructions associated with the mobile operating system and the plurality of applications; and
    at least one processor that executes the instructions to:
        receive an indication of a first gesture detected by the touch screen at a location at which a particular icon from the plurality of icons is displayed;
        determine a type of gesture associated with the first gesture, the type of gesture including a default gesture associated with a default action to open or execute an application represented by the particular icon or an action-select gesture associated with a menu of multiple selectable actions to perform with the application represented by the particular icon, the multiple selectable actions including at least one selectable action different than opening or executing the application represented by the particular icon;
        responsive to a determination that the type of gesture associated with the first gesture is the default gesture, open or execute the application represented by the particular icon;
        receive an indication of a second gesture detected by the touch screen at the location at which the particular icon is displayed;
        determine the type of gesture associated with the second gesture;
        responsive to a determination that the type of gesture associated with the second gesture is the action-select gesture associated with the menu of multiple selectable actions to perform with the application represented by the particular icon:
identify, based on the application represented by the particular icon, the multiple selectable actions to perform; and
output, for display, a menu indicating the multiple selectable actions to perform;
receive an indication of a third gesture detected by the touch screen at an area of the menu where a particular selectable action from the multiple selectable actions is displayed; and
responsive to the indication of the third gesture, execute the application represented by the particular icon to perform the particular selectable action.

10. The mobile computing device of claim 9, wherein the particular icon corresponds to a photo application and a selectable action among the menu of multiple selectable actions associated with the action-select gesture comprises sharing a photo on a predetermined photo sharing service.

11. The mobile computing device of claim 9, wherein the particular icon corresponds to an email application and a selectable action among the menu of multiple selectable actions associated with the action-select gesture comprises opening a screen within the graphical user interface for composing an email within the email application.

12. The mobile computing device of claim 9, wherein the default gesture is a single-tap gesture, and the action-select gesture is different than the single-tap gesture.

13. The mobile computing device of claim 9, wherein the at least one processor executes the instructions to determine a current context of the mobile computing device, the identification of the multiple selectable actions to perform being based on the current context of the mobile computing device.

14. The mobile computing device of claim 13, wherein the at least one processor executes the instructions prior to receiving the indication of the first gesture in order to:
associate a first set of the multiple selectable actions with a first context;
associate a second set of the multiple selectable actions with a second context;
responsive to a reception of the first gesture, determine the current context of the computing device is the first context and output a menu indicating the first set of the multiple selectable actions; and
responsive to a reception of the second gesture, determine the current context of the computing device is the second context and output a menu indicating the second set of the multiple selectable actions.

15. The mobile computing device of claim 13, wherein at least one of the menu of selectable actions to perform with the application represented by the particular icon that is based on the current context is an action previously determined for the current context by a user of the computing device.

16. A computer-readable storage medium comprising instructions that, when executed, cause at least one processor of a mobile computing device to:
receive an indication of a first gesture detected by the touch screen at a location at which a particular icon from the plurality of icons is displayed;
determine a type of gesture associated with the first gesture, the type of gesture including a default gesture associated with a default action to open or execute an application represented by the particular icon or an action-select gesture associated with a menu of multiple selectable actions to perform with the application represented by the particular icon, the multiple selectable actions including at least one selectable action different than opening or executing the application represented by the particular icon;
responsive to a determination that the type of gesture associated with the first gesture is the default gesture, open or execute the application represented by the particular icon;
receive an indication of a second gesture detected by the touch screen at the location at which the particular icon is displayed;
determine the type of gesture associated with the second gesture;
responsive to a determination that the type of gesture associated with the second gesture is the action-select gesture associated with the menu of multiple selectable actions to perform with the application represented by the particular icon:
identify, based on the application represented by the particular icon, the multiple selectable actions to perform; and
output, for display, a menu indicating the multiple selectable actions to perform;
receive an indication of a third gesture detected by the touch screen at an area of the menu where a particular selectable action from the multiple selectable actions is displayed; and
responsive to the indication of the third gesture, execute the application represented by the particular icon to perform the particular selectable action.

17. The computer-readable storage medium of claim 16, wherein the default gesture is a single-tap gesture, and the action-select gesture is different than the single-tap gesture.

18. The computer-readable storage medium of claim 16, wherein the instructions, when executed, further cause the at least one processor to determine a current context of the mobile computing device, the identification of the multiple selectable actions to perform being based on the current context of the mobile computing device.

19. The computer-readable storage medium of claim 18, wherein the instructions, when executed, further cause the at least one processor, prior to receiving the indication of the first gesture, to:
associate a first set of the multiple selectable actions with a first context;
associate a second set of the multiple selectable actions with a second context;
responsive to a reception of the first gesture, determine the current context of the computing device is the first context and output a menu indicating the first set of the multiple selectable actions; and
responsive to a reception of the second gesture, determine the current context of the computing device is the second context and output a menu indicating the second set of the multiple selectable actions.

20. The computer-readable storage medium of claim 18, wherein at least one of the menu of selectable actions to perform with the application represented by the particular icon that is based on the current context is an action previously determined for the current context by a user of the computing device.

* * * * *